United States Patent
Asada et al.

(10) Patent No.: US 12,440,911 B2
(45) Date of Patent: Oct. 14, 2025

(54) ROBOTIC WELDING SYSTEMS

(71) Applicants: Massachusetts Institute of Technology, Cambridge, MA (US); Sumitomo Heavy Industries Limited, Yokosuka (JP)

(72) Inventors: Haruhiko Harry Asada, Lincoln, MA (US); Haruhiko Eto, Yokosuka (JP)

(73) Assignees: Massachusetts Institute of Technology, Cambridge, MA (US); SUMITOMO HEAVY INDUSTRIES, LTD., Tokyo (JP)

( * ) Notice: Subject to any disclaimer, the term of this patent is extended or adjusted under 35 U.S.C. 154(b) by 1057 days.

(21) Appl. No.: 17/070,652

(22) Filed: Oct. 14, 2020

(65) Prior Publication Data

US 2022/0055138 A1  Feb. 24, 2022

Related U.S. Application Data

(60) Provisional application No. 63/067,973, filed on Aug. 20, 2020.

(51) Int. Cl.
  *B23K 9/095* (2006.01)
  *B23K 37/02* (2006.01)

(52) U.S. Cl.
  CPC .......... *B23K 9/0953* (2013.01); *B23K 9/0956* (2013.01); *B23K 37/0247* (2013.01)

(58) Field of Classification Search
  CPC .......... B23K 9/09; B23K 9/093; B23K 9/095; B23K 9/0956; B23K 9/10; B23K 9/1087; B23K 10/006; B23K 10/02; B23K 37/0247; B23K 37/0282; B23K 37/0294; B23K 9/0216; B23K 9/022; B23K 9/0953; B23K 9/12; B23K 9/125
  USPC ...................................................... 219/124.1
  See application file for complete search history.

(56) References Cited

U.S. PATENT DOCUMENTS

| | | | |
|---|---|---|---|
| 6,212,443 B1 | 4/2001 | Nagata et al. | |
| 10,564,635 B2 * | 2/2020 | Sato | B25J 13/085 |
| 10,888,996 B2 * | 1/2021 | Tabandeh | G05B 19/423 |
| 11,345,019 B2 * | 5/2022 | Hane | B25J 9/1664 |
| 2006/0069466 A1 | 3/2006 | Kato et al. | |
| 2015/0217449 A1 | 8/2015 | Meier et al. | |
| 2018/0095640 A1 * | 4/2018 | Albright | G06F 3/04847 |
| 2018/0348744 A1 * | 12/2018 | Cortsen | G05B 19/423 |

(Continued)

FOREIGN PATENT DOCUMENTS

| | | |
|---|---|---|
| JP | 2001-51712 | 2/2001 |
| JP | 2008302386 A * | 12/2008 |

OTHER PUBLICATIONS

International Search Report for PCT/US 20/55582 mailed on Jan. 22, 2021.

(Continued)

*Primary Examiner* — Chris Q Liu
(74) *Attorney, Agent, or Firm* — IPUSA, PLLC

(57) ABSTRACT

A robotic welding systems and related methods are described. In some embodiments, a robotic welding system may generate a target trajectory based at least partly on a trajectory of a welding torch during manual operation of the welding torch; and operate one or more actuators of the system to control movement of the welding torch based at least partly on the target trajectory.

9 Claims, 12 Drawing Sheets

(56) References Cited

U.S. PATENT DOCUMENTS

2020/0384563 A1* 12/2020 Jo .......................... B23K 9/125
2021/0086285 A1* 3/2021 Nadler ................. H05H 1/3494

OTHER PUBLICATIONS

Eto et al., Seamless Manual-to-Autopilot Transition: An Intuitive Programming Approach to Robotic Welding. 2019 28th IEEE International Conference on Robot and Human Interactive Communication (RO-MAN), New Delhi, India, 2019:1-7, doi: 10.1109/RO-MAN46459.2019.8956403.

* cited by examiner

ROBOTIC WELDING SYSTEMS

RELATED APPLICATIONS

This application claims the benefit under 35 U.S.C. § 119(e) to U.S. provisional application Ser. No. 63/067,973, filed Aug. 20, 2020, the disclosure of which is incorporated herein by reference in its entirety.

FIELD

Disclosed embodiments are related to robotic welding systems, as well as related methods of operation.

BACKGROUND

At manufacturing sites, such as sites for shipbuilding, automated robotic systems are known to be used to perform welding operations. For example, some conventional systems employ a robotic arm to move a welding torch. The robotic arm and welding torch may be disposed on a carriage capable of moving the welding torch and robotic arm along a rail or other track. It is known that in some applications, the robotic arm moves the welding torch in a desired pattern while the robotic arm and welding torch are propelled along the welding track by an associated self-propelled carriage. To operate these automated devices, a user must program a number of parameters into the robotic welding system, including the trajectory of the arm, the movement speed of the carriage, and the shape of the motion of the robotic arm and welding torch to perform a desired welding operation.

SUMMARY

In some embodiments, a robotic welding system includes a welding torch; a support configured to support the welding torch during a welding operation; one or more actuators operatively coupled to the support, wherein the one or more actuators are configured to control a movement of the support and the welding torch in one or more directions; an input device configured to receive operator input related to manual operation of the welding torch; and a processor operatively coupled to the one or more actuators and the input device, wherein the processor is configured to perform the steps of: generating a target trajectory based at least partly on a commanded trajectory of the welding torch during manual operation of the welding torch using the input device; and operating the one or more actuators to control movement of the welding torch based at least partly on the target trajectory.

In some embodiments, a method of operating a robotic welding system includes generating a target trajectory of a welding torch based at least partly on a commanded trajectory of the welding torch during manual operation, and controlling motion of the welding torch based at least partly on the target trajectory.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
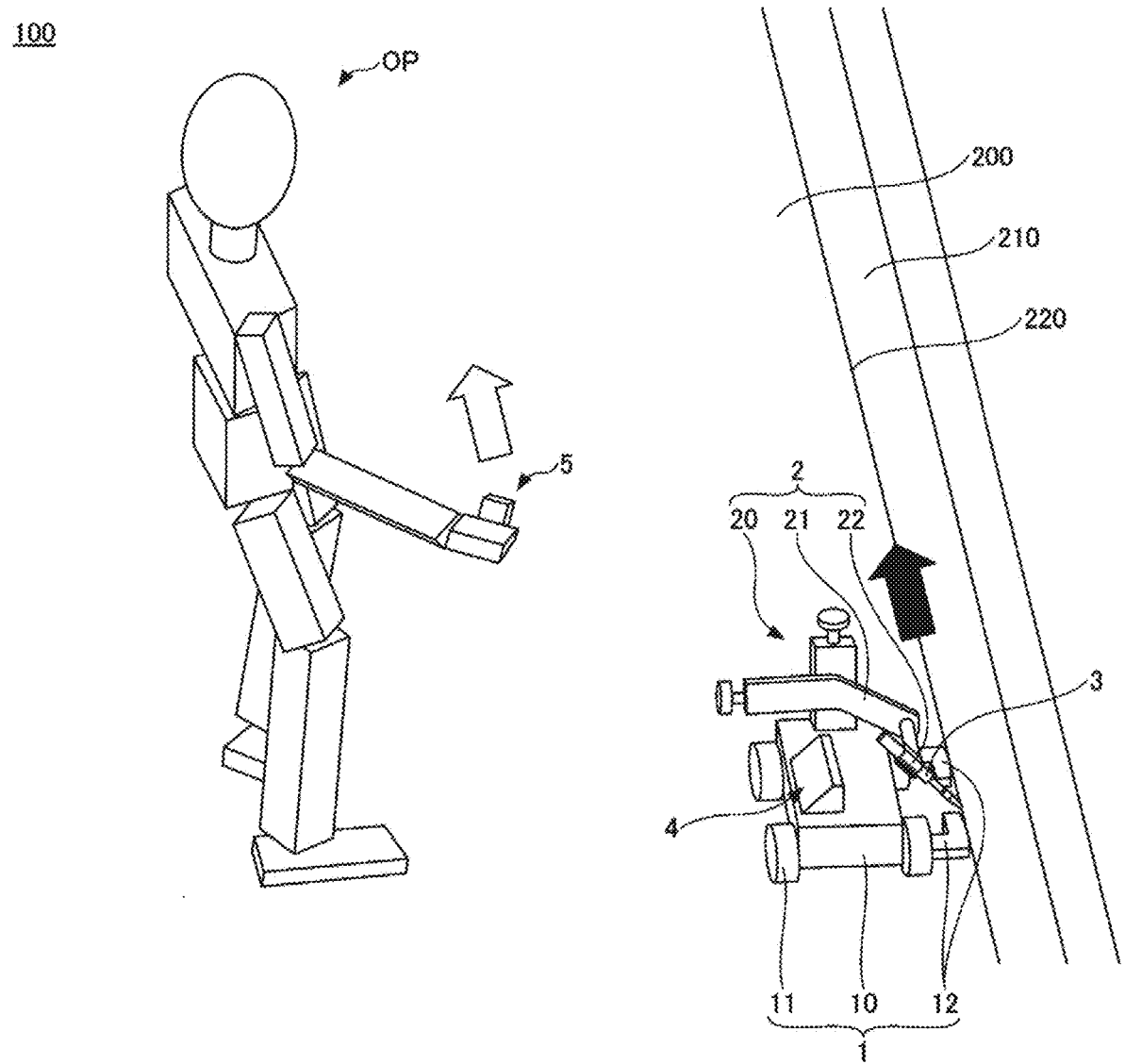
FIG. 1A shows an operator training a robotic welding system using a remote input device according to one illustrative embodiment.

Welding, among other tasks is an important manufacturing process in heavy industries. Shipbuilding, for example, requires a number of welding operations. Conventional robotic welding systems require an operator to input numerous parameters (e.g., feed rate, swing width, frequency, weaving shape, travel speed, size etc.) into a pendant or control panel to teach the robotic welding system to execute a set of commands or follow a predetermined path. While this approach is suitable for mass production, the approach requires tedious, time-consuming programming. Conventionally, an operator may set these motion parameters manually by turning dials and pushing buttons on the control panel of the robotic welding system. Of course, the user may also employ some other type of programming tool. However, this process does not fit low-volume manufacturing, such as shipbuilding and other applications where very few repeatable welding operations are performed.

In addition to the above, conventional robotic welding systems are generally only suitable for executing geometrically simple welds. Thus, a typical system using parameter setting provides for less flexibility for adapting to a variety of workpieces, which are common in small-scale welding operations, such as shipbuilding. For example, the parameter setting process is not intuitive for human operators. Therefore, an operator may input wrong values, requiring the operator to continuously guess, check, and revise their inputs. Additionally, due to the variety of complex geometries and variety of different work pieces, a human operator may need to perform this operation numerous times to account for each possible geometry and/or workpiece.

In view of the above, the Inventors have recognized the advantages of a robotic welding system capable of learning the desired operating parameters for a target welding trajectory from a real-time operator demonstration. Particularly, the Inventors have recognized the advantages of a robotic welding system able to collect data of the motion of a welding torch operated by a welder executing a welding task either by direct manipulation of the welding torch and/or through remote operation of the welding torch. Thus, the robotic welding system may sense or otherwise determine the motion of a welding torch during a welding operation to determine appropriate operating parameters for controlling operating of the welding torch. The subsequently determined operating parameters may then be used by the robotic welding system to autonomously perform the rest of the welding task.

In view of the above, in some embodiments, a human operator may initially perform a welding operation using the robotic welding system without inputting any parameters. Thus, the operator need not know the optimal welding parameters for the task before beginning the welding operation. The robotic welding system may monitor the manual operation of the system as the welding operation is performed. Thus, the operator begins to teach the robotic welding system the appropriate parameters for the welding operation during actual operation. Thus, the robotic welding system may be easy to use, eliminating the need for the operator to input numerous parameters (e.g., feed rate, swing width, frequency, weaving shape, travel speed, size etc.) into a pendant or control panel of the robotic welding system. Furthermore, the process of teaching the robotic welding system based on an operator's demonstration may allow the robotic welding system to learn a broader class of patterns and/or trajectories for various welding operations. Particularly, a skilled human operator may demonstrate a series of subtle movements or skillful operations not ordinarily programmable when parameters are input via a pendant or control panel.

In some embodiments, a robotic welding system includes a welding torch, a support, one or more actuators, an input device, and a processor. The support may be capable of holding the welding torch, particularly, during a welding operation. In turn, the one or more actuators may be operatively coupled to the support and/or the welding torch such that the one or more actuators may move the support and/or the welding torch in one or more directions. The input device may be capable of receiving input from the operator regarding the operator's manual operation of the welding torch during a welding operation. Depending on the particular application, the input device may either be a remote input device, the welding torch itself, and/or any other appropriate input device capable of detecting motions of an operator for manipulating the welding torch in a desired welding pattern. The processor may be operatively coupled to the one or more actuators and the input device such that the processor may control the one or more actuators, based on one or more signals received from the input device. For example, the processor may perform two steps: (1) a step of generating a target trajectory for autonomous operation of the welding torch based at least partly on data collected from the input device regarding a commanded trajectory of the welding torch when an operator is manually operating the welding torch; and (2) a step of operating the one or more actuators to control movement of the welding torch based at least partly on the target trajectory. Thus, a robotic welding system according to one or more aspects of the present disclosure may execute tasks as demonstrated by a human operator, eliminating the need for tedious, on-site parameter calculations and input.

In some embodiments, the disclosure is embodied as a method of operating a robotic welding system. The method may include the steps of (1) generating a target trajectory (i.e. trajectory for automated operation) of a welding torch based at least partly on a commanded trajectory of the welding torch during manual operation; and (2) controlling motion (via, for example, the one or more actuators) of the welding torch based at least partly on the target trajectory.

In addition to learning a desired target trajectory from manual operation of a welding torch, in some instances, it may be desirable for a robotic welding system to transition from manual to automatic control after learning the desired target trajectory. Accordingly, the Inventors have recognized the advantages of a robotic welding system capable of automatically transitioning between learning the parameters for operating a robotic welding system and controlling motion of the welding torch of the robotic welding system using the determined operating parameters. Particularly, the Inventors have recognized the advantages of a system allowing an operator to begin a manual welding operation where the robotic welding system may take over once the robotic welding system has learned the parameters of the welding operation based at least partly on the commanded trajectory of the welding torch during manual welding operation. Thus, in some embodiments, the robotic welding system is capable of transitioning from manual operation to autonomous operation seamlessly (i.e. without user input). For example, in some embodiments, a skilled human operator may manually perform a welding operation for the first few segments. The robotic welding system includes a processor capable of executing a real-time estimation algorithm configured to analyze the movement data associated with the human operator's manual input during the welding operation and identify the intended operation of the human welder. Once the processor identifies the associated operating parameters, the processor may take over the welding operation and complete the welding operation without additional operator input. Of course, in some embodiments, a robotic welding system may include an appropriate input such that a user can intervene in the robot's movements during automatic operation. For example, a user might press a safety or stop switch to stop autonomous operation of the robot.

In a specific embodiment, a processor of a robotic welding system may transition operation of a robotic welding system between a training mode and an autonomous mode where the robotic welding system may begin in a training mode where a human operator may manually operate that welding torch during a welding operation. The processor may then collect data regarding the movement of the welding torch from the input device, as described above. The processor then may then generate a prediction or estimation of the trajectory of the welding torch as operated by the human operator (i.e. a target trajectory). The processor may then compare the prediction to the commanded trajectory of the torch, which may be a sensed actual trajectory of the welding torch and/or a sensed movement from an input device used to control operation of the welding torch. This comparison may be used to determine an error between the prediction and the commanded trajectory. The processor may repeat these steps until the computed error drops below a predetermined error threshold. Once the computed error drops below the predetermined error threshold (i.e. the target trajectory converges with the commanded trajectory), the processor may transition from the training mode to the autonomous mode, where the processor operates the welding torch without input from the human operator. Depending on the embodiment, when transitioning to an autonomous mode, the processor of a robotic welding system may no longer update the trajectory based on data received from the input device. Of course, it should be understood that a processor may be configured to transition from the training mode to the autonomous mode in a number of suitable ways. For example, in some embodiments, the processor may transition from the training mode to the autonomous mode after a fixed time period, a predefined number of welding torch cycles, and/or any other suitable metric.

In some embodiments, due to a robotic welding system including multiple degrees of freedom, when computing the target trajectory based on the commanded trajectory of the welding torch during manual operation, the processer may seek to converge the target trajectory to the commanded trajectory by minimizing the error between the target trajectory and the commanded trajectory in each degree of freedom. In some embodiments, the processor transitions from the training mode to the autonomous mode when the error between the target trajectory in each degree of freedom and the commanded trajectory in each degree of freedom is below a predetermined error threshold.

While specific methods for transitioning to an autonomous operation mode are described above, it should be understood that other ways of determining an appropriate timing for transitioning to an autonomous operation mode are also contemplated. For example, an operator may use any suitable method to train the robotic welding system. Particularly, the processor may use any appropriate method to determine the target trajectory based on the commanded trajectory. For instance, the processor may transition from the training mode to the autonomous mode when an average error of the various operating parameters between the target trajectory and the commanded trajectory falls below a predetermined threshold error. Alternatively, the processor may transition from the training mode to the autonomous mode when an instantaneous error between the target trajectory and the commanded trajectory falls below a predetermined threshold error. In some embodiments, the processor transitions from the training mode to the autonomous mode when an average error between the target trajectory and the commanded trajectory falls below a predetermined threshold error for a specified time period. In other embodiments, the processor may transition from the training mode to the autonomous mode when an instantaneous error between the target trajectory and the commanded trajectory falls below a predetermined threshold error for a specified time period. Thus, it should be appreciated that the currently disclosed systems and methods are not limited to any particular method of transitioning between the training and autonomous modes of operation of a robotic welding system.

A target trajectory for the operation of a robotic welding system may include any appropriate number and type of operating parameters depending on the particular types of welds to be formed and the number of degrees of freedom of movement of the robotic welding system. For example, in some embodiments, a welding trajectory may include a plurality of discrete motions that may either be performed sequentially and/or simultaneously with one another to provide a desired overall target trajectory. For example, in some embodiments, a target trajectory may be modeled as a combination of a sinusoidal function and linear function. Thus, the series of parameters may include a frequency, an amplitude, a phase angle, a linear velocity, and a bias for the operation of the various degrees of freedom of movement of the robotic welding torch. Of course, the target trajectory need not be modeled as a combination of a sinusoidal function and linear function, as the target trajectory may be modeled using any suitable method. For example, the target trajectory may be generated using any suitable real-time model, including both parametric and non-parametric models. Of course, non-real time models may also be used when appropriate.

The various methods and systems described herein may use any appropriate estimation technique for determining the operating parameters of a target trajectory from a measured reference trajectory. For example, a Recursive Least Squares ("RLS") estimation, Extended Kalman Filter, and/or any other suitable real-time estimation method may be used. Additionally, in some instances, it may be desirable to estimate a frequency of a measured reference trajectory prior to determining the one or more other operating parameters of a target trajectory. In such an embodiment, any appropriate frequency estimation method may be used including, for example, a Discrete Fourier Transform ("DFT") algorithm, and/or any other suitable algorithm may be used. Of course, while the above illustrative embodiments describe parametric estimation techniques, the process may also generate a target trajectory based on non-parametric estimation techniques, for example, Gaussian Process Fitting.

To help reduce training times, it may be desirable to provide an initial estimate of the operating parameters for a target trajectory to a real-time estimator. In such an embodiment, an initial estimation based on an initial batch of data from the welding torch may be used. For example, the initial batch of data may be collected over a few seconds of the welding operation. The data may then be stored in a buffer for a processor to analyze. The processor may estimate the parameters based on the batch data, and the resulting initial estimate of the target trajectory may be input into the real-time estimator for subsequent refinement which may reduce the time to converge on a desired solution.

When a robotic welding system transitions from the training mode to the autonomous mode, it may be desirable for the robotic welding system to include features that alert the operator of the change to the autonomous mode. In some embodiments, the robotic welding system may provide a human operator with an indication, such as a light, sound, or other indicator to inform the operator that the processor has learned the operator's target pattern or trajectory and is switching to autonomous operation. Thus, the human operator may then be free to perform other tasks, for example demonstrating a pattern or trajectory to another robotic welding system. For example, a robotic welding system may include an indicator light, or series of indicator lights, that may turn on, turn off, change color, blink, and/or display patterns to indicate that the robotic welding system is entering the training mode, the autonomous mode, and/or when training is nearly done. Alternatively, in some embodiments, a robotic welding system may include a speaker configured to emit one or more indicator tones when the robotic welding system enters the training mode, the autonomous mode, and/or when training is nearly done. Of course, alert indications need not be limited to only light and sound indications, as other suitable alert indications are also contemplated.

To provide the sensed operating parameters associated with manual operation of a robotic welding torch, a robotic welding system may include any appropriate combination of sensors associated with the various arms, joints, movement of a supporting base, and/or any other component capable of imparting motion to a welding torch. For example, in some embodiments, movement of a self-propelled carriage (e.g. velocity and direction), may be monitored with one or more sensors while movement of a robotic arm relative to the support may be monitored with one or more additional sensors. Examples of appropriate types of sensors may include, but are not limited to, an inertial measurement unit, a three-axis accelerometer, a gyroscope, a magnetometer, an infrared motion sensor, an encoder, a linear variable differential transformer, a velocitometer, optical sensors, laser sensors, and/or any other suitable type of sensor. The sensors may be configured to sense information such as the relative position (angular and/or Cartesian), velocity, direction, frequency, distance, and/or any other appropriate operating parameter of a component of a robotic welding system.

As noted above, in some embodiments, an input device for manual operation of a robotic welding system may include the robotic welding torch itself. In such an embodiment, the operator may initially execute the welding operation using the welding torch of the robotic welding system just as they execute a conventional welding operation while the movements of the welding torch are monitored to determine a commanded trajectory of the welding torch. However, to permit the movement of the welding torch in such manner by an operator, it may be desirable for the one or more actuators of the robotic welding system to be back-drivable to permit the operator to move the welding torch in a desired pattern without unduly restricting the range of movement of the torch by the operator during training.

As also noted above, in some embodiments, a robotic welding system may include a separate manually operated input device that is configured to manually operate the welding torch of the system. For example, a robotic welding system may include a mock-up welding torch or other manually operated input where physical inputs, such as motions, of the operator may be sensed to determine a commanded trajectory of the torch of a robotic welding system. Depending on the particular application, the input device may either be wirelessly connected to the robotic welding system and/or a wired connection may be used. Additionally, the input device may either be located proximate to the robotic welding system and/or a remotely located operator may physically manipulate a remotely located input device to control operation of the torch of the robotic welding system. In either case, appropriate sensors such as an inertial measurement unit, a three-axis accelerometer, a gyroscope, a magnetometer, an optical sensor, an infrared motion sensor, or any other suitable type of sensor may be used to detect one or more physical inputs from a user for commanding operation of the welding torch of the robotic welding system.

Depending on the particular application, a robotic welding system may have any appropriate number and/or type of degrees of freedom of movement for a welding torch. For example, a support disposed on a self-propelled carriage may provide movement in one or more directions parallel to a supporting surface that the support is disposed on. Additionally, various arms, linkages, and other structures may be used to provide any desired combination of rotational degrees of freedom and linear degrees of freedom of movement in any number of directions. Accordingly, it should be understood that the robotic welding systems described herein are not limited to any particular number and/or type of directions of movement of a welding torch as the disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A is an example of a welding operation using a robotic welding system 100 to weld a corner portion 220 formed between a floor surface 200 and a wall 210 perpendicular to floor surface 200. Robotic welding system 100 includes a self-propelled carriage 1, a support 2 disposed on the self-propelled carriage, a welding torch 3, a processor 4, and a remote input device 5. Self-propelled carriage 1 includes a carriage body 10, a plurality of wheels 11, and may also include a guide 12. The guide 12 may be configured to maintain a constant distance between carriage body 10 and a proximate structure such as the adjacent wall 210. This allows the self-propelled carriage 1 to travel along the wall 210. Plurality of wheels 11 may be driven by one or more actuators, such as a single drive motor, a set of drive motors including a drive motor for each wheel, or any other suitable actuator.

The support 2 may include one or more components to control the movement and/or position of the welding torch 3 relative to the self-propelled carriage including, for example, a slide stage 20, an arm 21, and a clamp 22. Slide stage 20, which may be attached to carriage body 10, and may be configured to slide arm 21 in one or more cardinal directions (i.e. up, down, left, and right). Clamp 22 may be positioned on an end of arm 21 to hold the welding torch 3. Arm 21 may include an oscillating motor or one or more other suitable actuators configured to oscillate welding torch 3 parallel to the direction of motion of self-propelled carriage 1.

In some embodiments, welding torch 3 is held in clamp 22. Thus, welding torch 3 may be moved in the travel direction of self-propelled carriage 1, as self-propelled carriage 1 translates along wall 210. Moreover, welding torch 3 may be moved and/or oscillated in a direction orthogonal to the travel direction of self-propelled carriage 1 as clamp 22 is oscillated. That is, self-propelled carriage 1 may move welding torch 3 in a first direction, while arm 21 may move welding torch 3 in a second direction orthogonal to the first direction.

Processor 4 may include associated memory in the form of one or more non-transitory processor readable mediums that includes processor readable instructions that when executed cause the processor and disclosed robotic welding systems to perform the various methods described herein. Thus, the processor may both monitor operation of and control operation of the robotic welding system. For example, the processor may control operation of the welding torch 3 along a specified trajectory by controlling the one or more actuators of robotic welding system 100. For example, processor 4 may actuate the plurality wheels 11 of self-propelled carriage 1 or actuate the oscillating motor of arm 21.

As previously described, a remote input device 5 may allow an operator OP to remotely control the movement of welding torch 3. For example, remote input device 5 may include an IMU (Inertial Measurement Unit) or other suitable sensor and a communications array to both a sense and transmit data related to the operator OP's motion to a processor of robotic welding system 100. Thus, by moving remote input device 5, the IMU detects the hand motion of operator OP. The communications array then transmits (inputs) the hand motion of the operator OP as detected by the IMU to processor 4. Furthermore, remote input device 5 and processor 4 may be connected via a wired or wireless connection. Though other types of input devices and communication strategies may also be used as previously described.

Figure 1B:
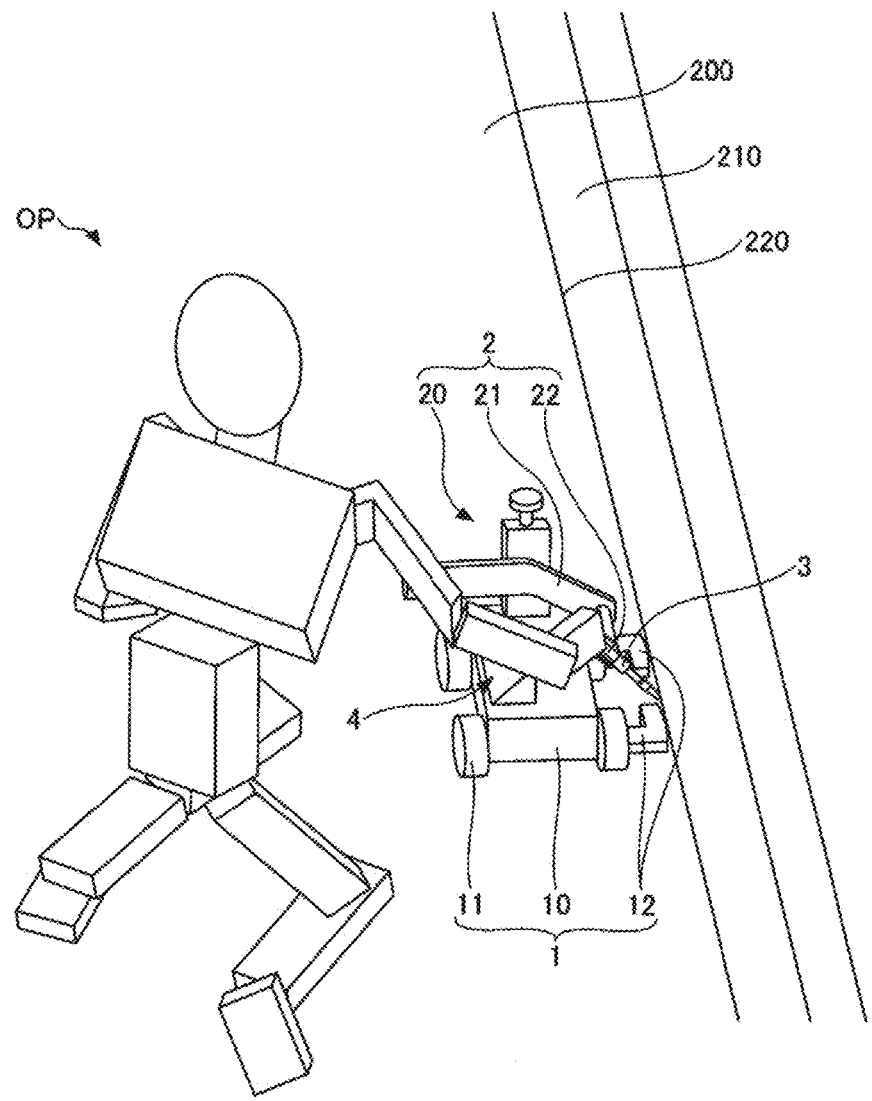
FIG. 1B shows an operator training a robotic welding system by manually operating a welding torch of the robotic welding system according to one illustrative embodiment.

FIG. 1B shows an example of a welding operation using robotic welding system 100A similar to that described above relative to FIG. 1A. In the exemplary embodiment, operator OP directly operates welding torch 3. In contrast to the embodiment of FIG. 1A, this embodiment does not include a remote input device 5. Instead, processor 4 may collect data regarding the trajectory of welding torch 3 based on data received from one or more sensors disposed on welding torch 3 and/or one or more sensors disposed on support 2 and associated with components such as the slide stage 20, arm 21, and clamp 22, the actuators and/or wheels 11 of the self-propelled carriage, and/or any other component that may be used to move the welding torch. Of course, robotic welding system 100 need not be limited to the configurations shown in FIGS. 1A and 1B. For example, the methods and systems described herein may be used with any robotic system capable of performing a welding operation including, but not limited to an articulated robotic arm for moving the welding torch, a cart for moving a welding torch along a prelaid track, and/or any other suitable configuration.

Figure 2:
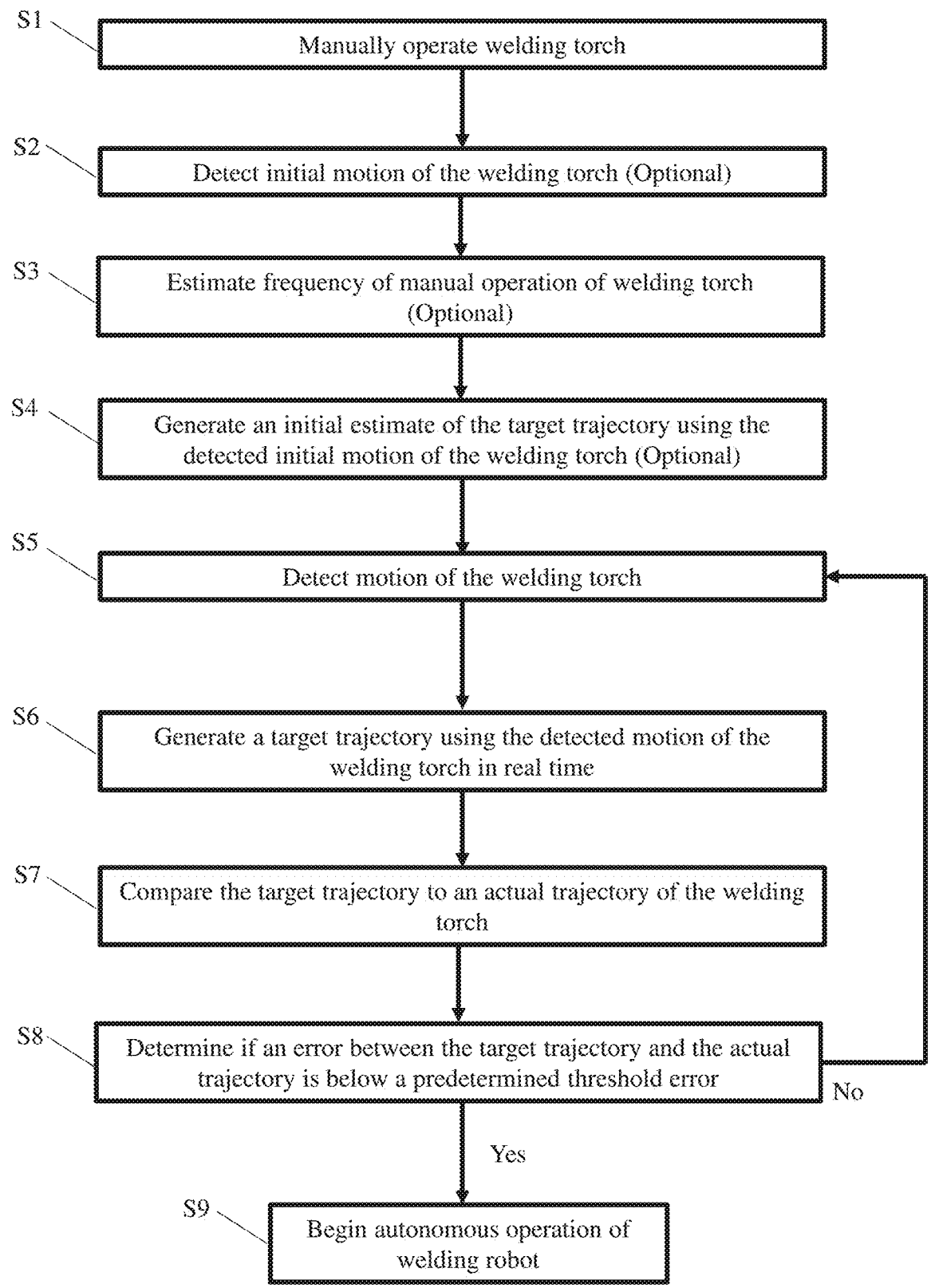
FIG. 2 is a flowchart showing a method of operating a robotic welding system according to one illustrative embodiment.

FIG. 2 is flowchart showing a method of training a robotic welding system according to an embodiment of the present disclosure. In step S1, operator OP manually operates welding torch 3 by either manipulating welding torch 3 directly or by controlling welding torch 3 with remote input device 5. As described above, operator OP may place robotic welding system 100 along corner portion 210. Operator OP may also adjust the position of welding torch 3 by adjusting guide 12 and slide stage 20. Operator OP may hold an input device 5 or the welding torch itself in their hand to control the welding torch. Additionally, robotic welding system 100 may include an adjustment mechanism (not shown) for guide 12 and slide stage 20, controlled by processor 4. Thus, processor 4 may be configured to adjust guide 12 and slide stage 20 by controlling the adjustment mechanism based on the operation of the remote input device 5.

In step S1, arm 21 oscillates welding torch 3 based on the operation (input) of the remote input device 5 and/or welding torch, which measures the hand motion of operator OP. During step S2, welding torch 3 is manually operated by operator OP, and processor 4 stores the data regarding the trajectory of the welding torch 3 in a buffer. Processor 4 continues to store the data regarding the trajectory of the welding torch 3 until a predetermined condition is met. The predetermined condition may be a predetermined number of periodic oscillation operations, a predetermined time interval, a predetermined length of welding, or any other suitable condition. Of course, processor 4 may skip steps S2, and related steps S3 and S4, as they are optional.

In step S3, processor 4 proceeds to estimate the frequency of the trajectory of welding torch 3 during manual operation based on the data stored in the buffer. For example, processor 4 may estimate the frequency of the trajectory of welding torch 3 using a Discrete Fourier Transform or any other suitable estimation method. Once processor 3 has estimated the frequency of the trajectory of welding torch 3 using a Discrete Fourier Transform or any other suitable estimation method, processor 4 moves to step S4. Of course, processor 4 may skip step S3 and proceed to either step S4 or step S5, as step S3 is optional.

In step S4, processor 4 generates an initial estimate of the target trajectory (i.e. automated trajectory) using the detected initial motion of the welding torch, as stored in the buffer. Processor 4 may generate an initial estimate of the target trajectory based at least in part on the frequency estimated in step S3, though processor 4 may form an initial estimate of the target trajectory based only on the data stored in the buffer. Processor 4 may form the initial estimate of the target trajectory using a Batch Least Squares method of estimation or any other suitable method of estimation. Once processor 4 generates an initial estimate of the target trajectory, processor 4 moves to step S5. Of course, processor 4 may skip step S4 and proceed to step S5 from any of steps S1, S2, or S3, as step S4 is optional.

In step S5, processor 4 resumes detecting the motion of welding torch 3 in real time for the purposes of estimating the target trajectory using a real time estimator. In step S5, processor 4 collects data from welding torch 3 continuously, rather than storing the data in a buffer though embodiments in which a buffer is used for the sensed data is also contemplated.

In step S6, processor 4 generates a target trajectory using the detected motion of welding torch 3 in real time, using the data collected in step S5. The target trajectory may be determined using a real time estimator and in some embodiments may be based at least in part on the initial estimate of the target trajectory generated in step S4, the frequency estimate generated in step S3, and/or the detected motion of the welding torch in S5. Processor 4 may generate the target trajectory using any suitable linear or non-linear real time estimation method, such as Recursive Least Squares, Gaussian Process Fitting, or the Extended Kalman Filter. Once processor 4 generates the target trajectory, it may move to step S7.

In step S7, processor 4 compares the target trajectory generated in step S6 to the sensed commanded trajectory of welding torch 3 in real time as measured with the one or more sensors used to detect the motion of the welding torch. Processor 4 may compare the target trajectory to the commanded trajectory by calculating an error (i.e. difference) between the target trajectory and the commanded trajectory in one or more, and in some instances, each, degree of freedom for a given time step. Processor 4 may calculate the error by computing a difference, a variance, a number of standard deviations, or any other suitable measure of the error between the target trajectory and the commanded trajectory. Once processor 4 calculates the error (i.e. a measure of convergence between the target trajectory and the commanded trajectory), processor 4 moves to step S8.

In step S8, processor 4 compares the error values for the one or more degrees of freedom computed in step S7 to one or more predetermined threshold errors. The threshold error may be the same for each of the degrees of freedom or may vary among the degrees of freedom. Alternatively, an average error of the degrees of freedom may be compared to a threshold in some embodiment. In either case, if one or more error values, an average, or other metric for the error is greater than a respective error threshold, then processor 4 repeats steps S5-S8 to determine an updated target trajectory that is closer to the actual sensed trajectory of the welding torch. Alternatively, if the error values for each degree of freedom, an average of the error values, or other metric is less than or equal to the respective one or more error thresholds, then processor 4 proceeds to step S9 where the processor transitions to autonomous operation of robotic welding apparatus 100 where the processor controls movement of the welding torch based on the determined target trajectory without a need for further operator input.

Figure 3:
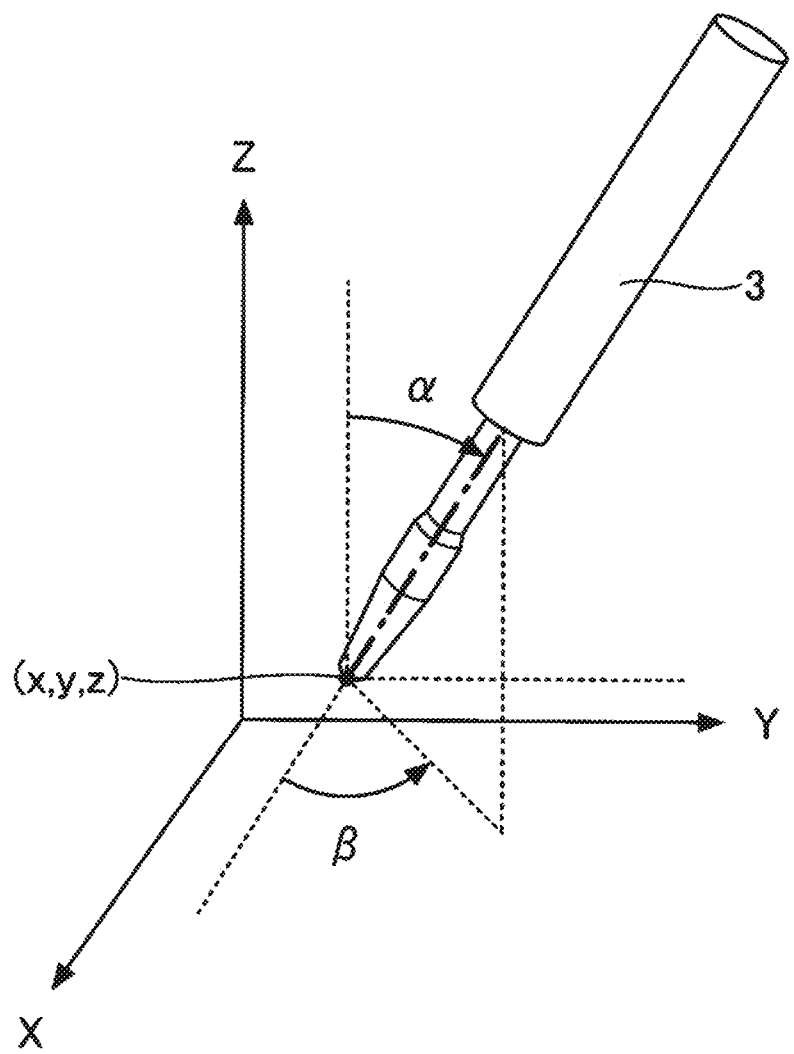
FIG. 3 is a schematic diagram showing the position and orientation of a welding torch of a robotic welding system according to one illustrative embodiment.

FIG. 3 shows the position of welding torch 3 modeled in three-dimensional space. Welding torch 3 may be axially symmetrical in some embodiments, thus the trajectory of welding torch 3 may be expressed in 5 degrees of freedom: 3 translational degrees of freedom and 2 rotational degrees of freedom. As shown in FIG. 3, x, y, and z represent the three translational degrees of freedom, while $\alpha$ and $\beta$ each represent a rotational degree of freedom. Thus, the position of welding torch 3 at any given time may be expressed as a vector of length 5, each entry corresponding to one degree of freedom of welding torch 3.

Figure 4:
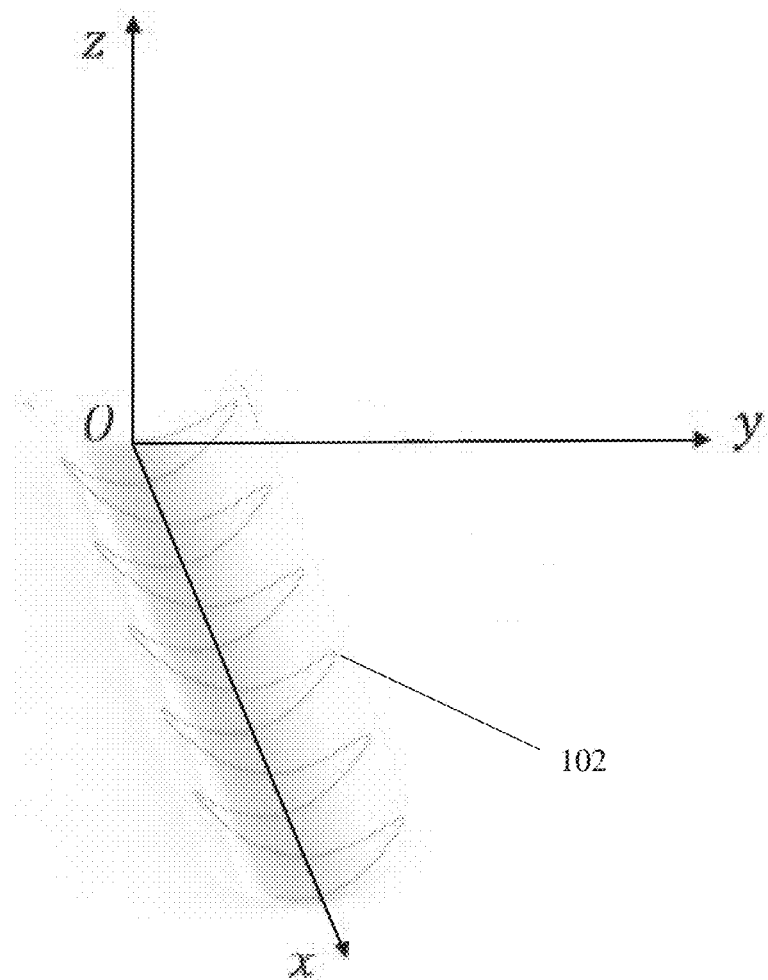
FIG. 4 is a graph showing a three-dimensional path of a welding torch of a robotic welding system according to one illustrative embodiment.

FIG. 4 shows an exemplary trajectory of welding torch 3 during manual operation. For example a trajectory 102 represents the path of the tip of welding torch 103 during manual operation. As will be appreciated trajectory 102 may take one a one, two, or three dimensional shape. When trajectory 102 takes on a two or three dimensional shape, the trajectory may be expressed as a series of parametric functions. For example, when trajectory 102 is three dimensional, trajectory 102 may be expressed using three functions: an x component as a function of time, a y component as a function of time, and a z component as a function of time. Of course, when trajectory 102 is two dimensional it may be similarly parameterized as an x component as a function of time and a y component as a function of time. Further, it should be understood that any other appropriate set of parameters and/or a non-parameter based model may also be used as the disclosure is not so limited.

Figure 5A:
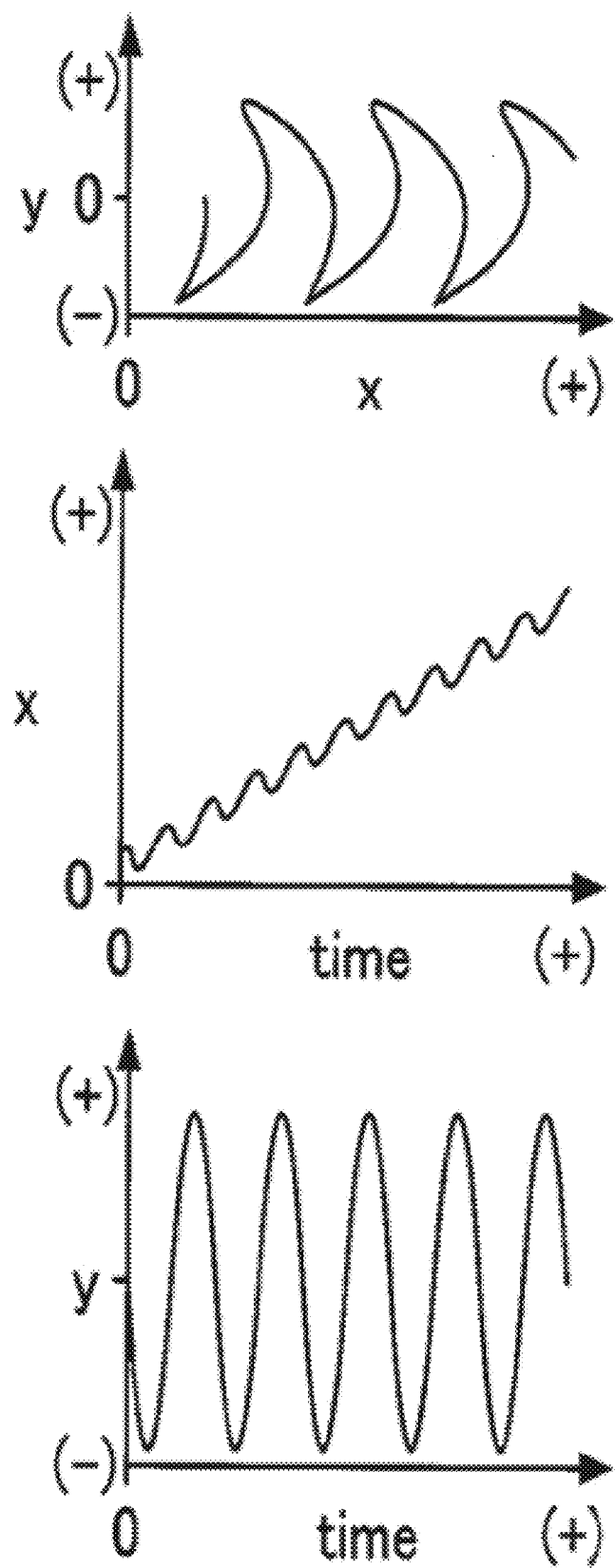
FIGS. 5A-5E are graphs showing examples of exemplary paths of a welding torch of a robotic welding system in different planes of motion according to one illustrative embodiment.
Figure 5B:
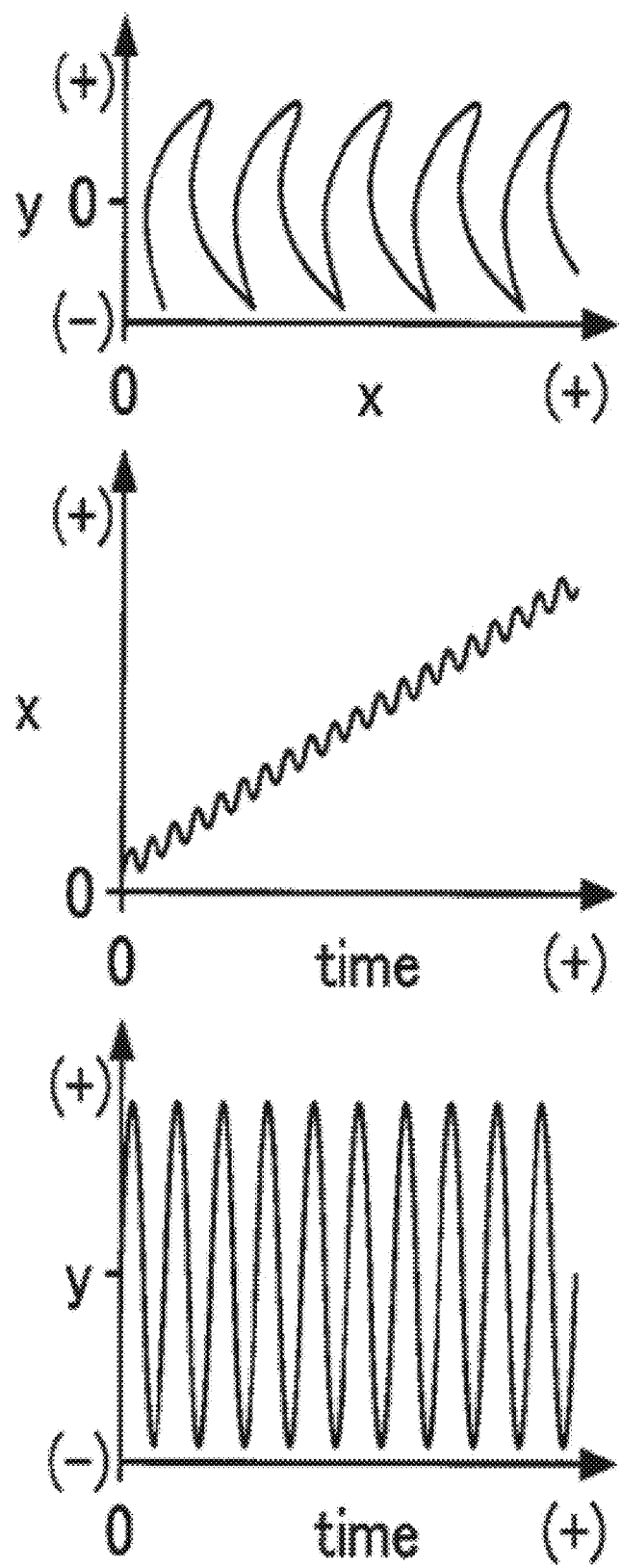
Figure 5C:
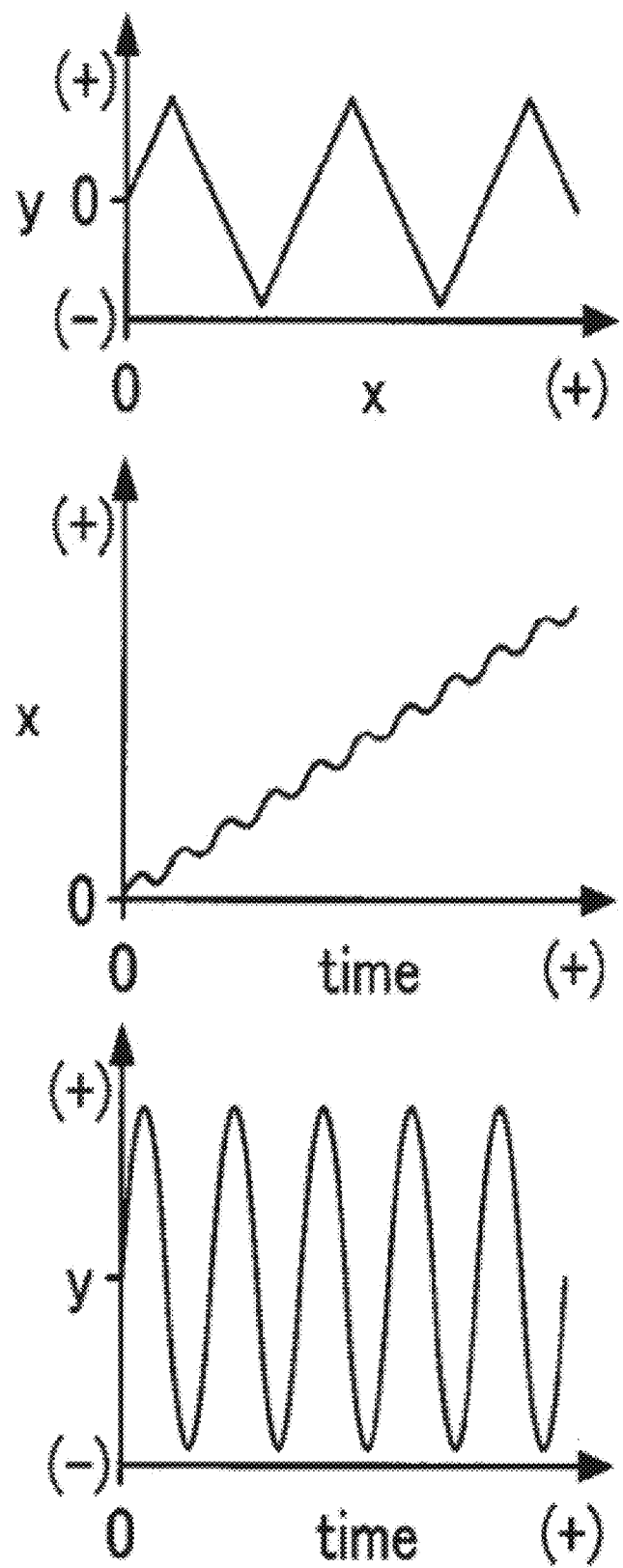
Figure 5D:
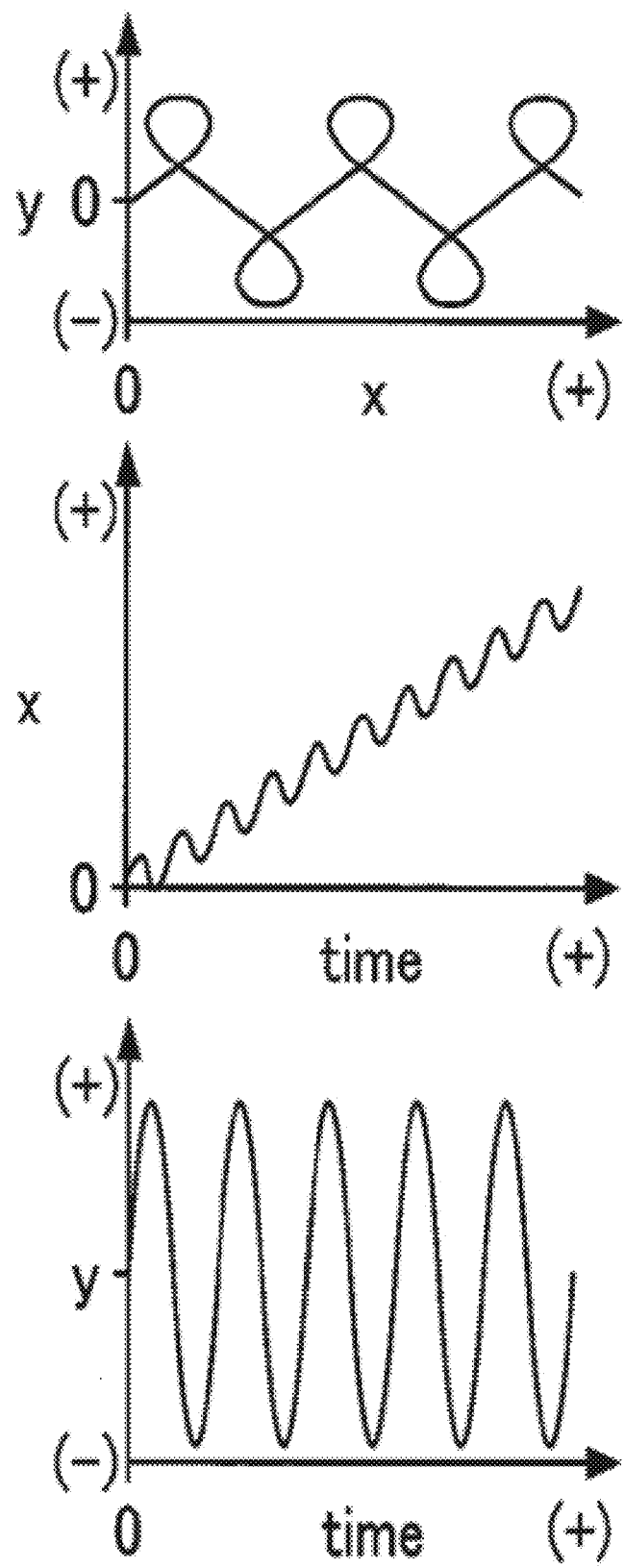
Figure 5E:
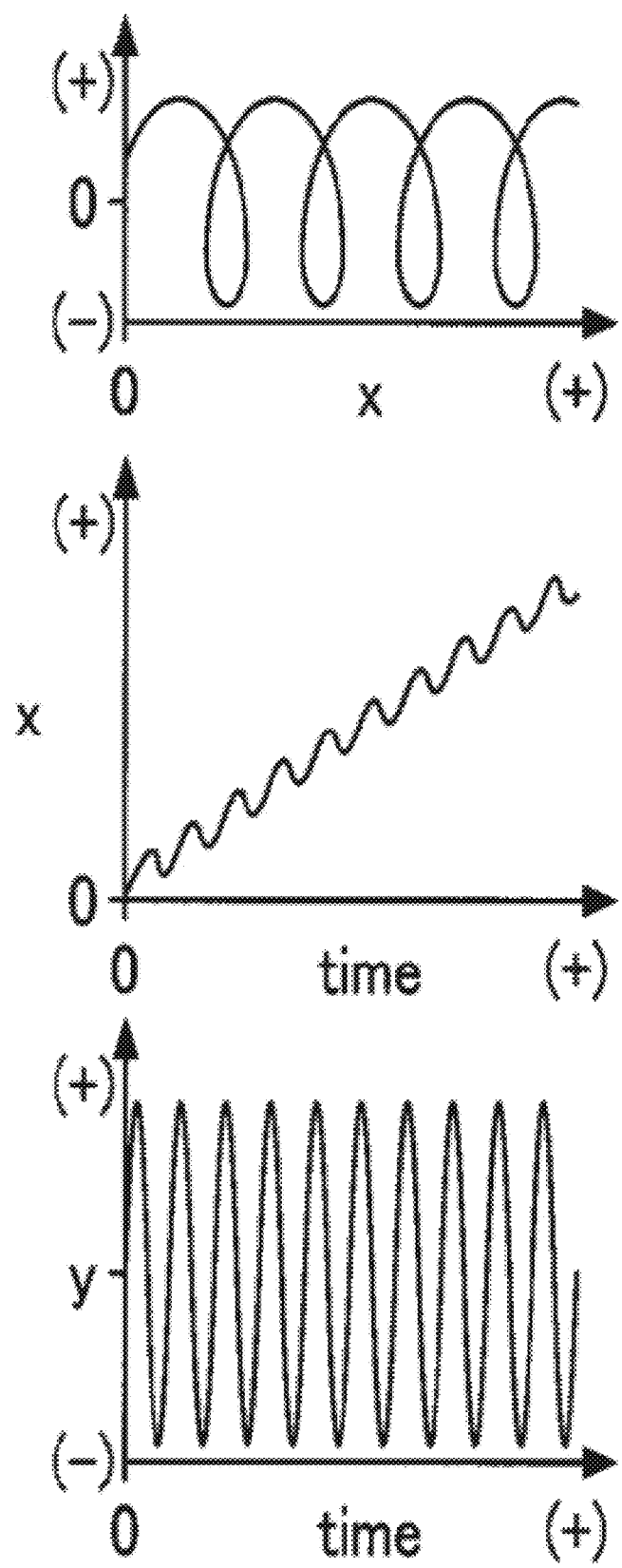

FIGS. 5A-5E show exemplary two-dimensional trajectories for welding torch 3, expressed as a trajectory in the x-y plane as well as the position in the x and y directions versus time. In the upper graph of each of FIGS. 5A-5E, the horizontal axis is the x-axis (direction of welding) and the vertical axis is the y-axis (direction of oscillation). In the middle graph, the horizontal axis is the time and the vertical axis is the x-axis (direction of welding). In the graph below, the horizontal axis is the time and the vertical axis is the y-axis (the direction of oscillation). FIG. 5A shows a convex welding trajectory. FIG. 5B shows a concave welding trajectory. FIG. 5C shows a Zigzag welding trajectory. FIG. 5D shows a FIG. 8 welding trajectory. FIG. 5E shows a circular welding trajectory.

Figure 6:
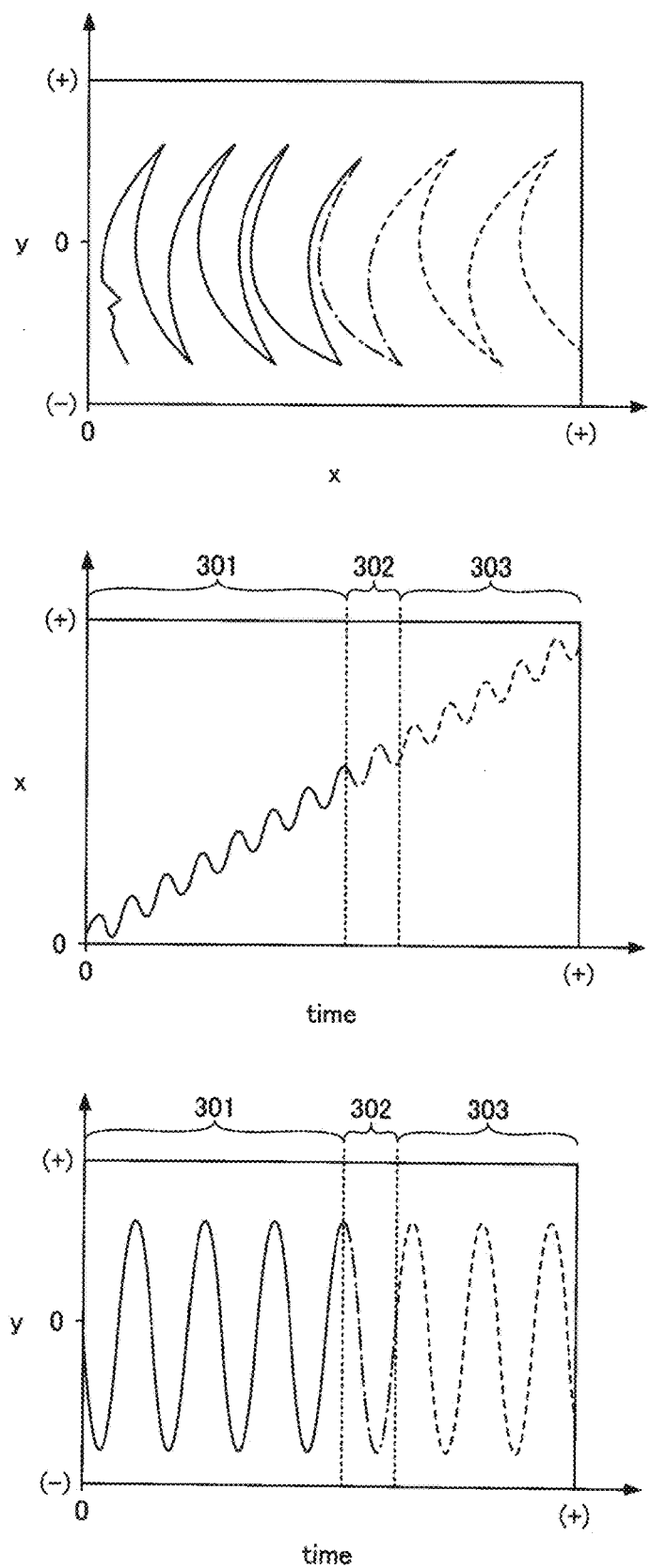
FIG. 6 is a graph showing a two-dimensional trajectory of a welding torch of a robotic welding system, wherein the robotic welding system transitions from training mode to an autonomous mode according to one illustrative embodiment.

FIG. 6 shows an example of a trajectory during a welding operation using robotic welding system 100. The upper graph of FIG. 6 shows the horizontal axis as the x-axis (direction of welding) and the vertical axis as the y-axis (direction of oscillation). In the middle graph of FIG. 6, the horizontal axis is time and the vertical axis is the y-axis (direction of oscillation). In the lower graph in FIG. 6, the horizontal axis is the time and the vertical axis is the x-axis (the direction the welding). Section 301 corresponds to a trajectory of welding torch 3 during manual operation. In the figure, this section is represented by solid lines. In section 301, data regarding the trajectory of welding torch 3 may be stored in a buffer to estimate either the frequency of the trajectory using a Discrete Fourier Transform or to generate an initial estimate of the target trajectory using a Batch Least Squares approximation. In section 302, processor 4 estimates the target trajectory in real time, using a Recursive Least Squares estimation. Processor 4 continues to perform this estimation until the error between the commanded trajectory and the target trajectory falls below a predetermined error in each degree of freedom. Section 302 is illustrated used dot-dash lines. In section 303, processor 4 is operating welding torch 3 autonomously, without user input, according to the target trajectory calculated in section 302. Section 303 is illustrated using evenly spaced dashed lines.

Figure 7:
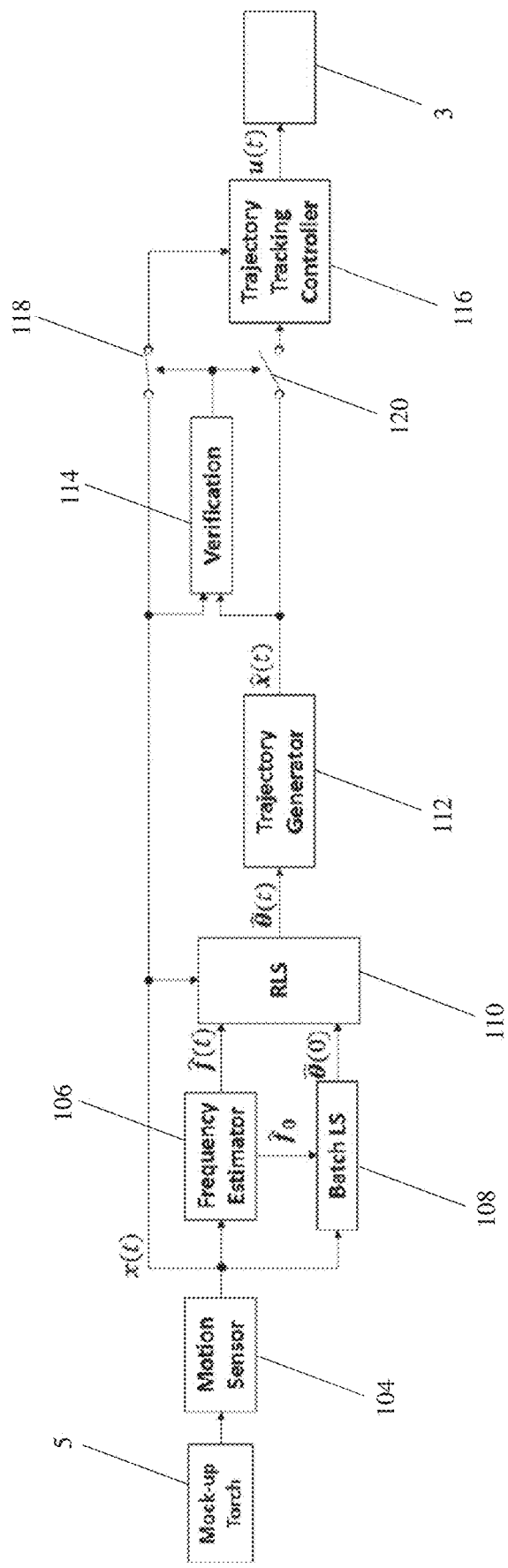
FIG. 7 is a schematic showing the functional components of a processer of a robotic welding system according to one illustrative embodiment.

FIG. 7 is a schematic diagram showing the data flow through processor 4 of robotic welding system 100. In some embodiments, one or more motion sensors 104 collect data regarding the movement of a remote input device 5 (i.e. mock-up torch), or a welding torch, during an initial manual welding operation. The data is collected in a buffer and then sent to a frequency estimator 106, which estimates the frequency of the trajectory in accordance with the methodology described above. In some embodiments, the data then travels to a batch least squares estimator 108 or other estimator, which generates an initial estimate of the target trajectory based at least in part on the frequency estimated by frequency estimator 106. The initial estimate of the target trajectory is then provided to a recursive least squares estimator 110 or other appropriate real time estimator, which determines the target trajectory based in part on the frequency estimated in frequency generator 106, the initial estimate of the target trajectory generated in batch least squares estimator 108, and/or the sensed/commanded motion of the welding torch. Of course, the data may skip batch least squares estimator 108 and be provided directly to a recursive least squares estimator 110. From recursive least squares estimator 110 the data is provided to a trajectory generator 112, which takes the statistical data analyzed by frequency estimator 106, batch least squares estimator 108, and recursive least squares estimator 110 and generate the target trajectory based on those data. A verification module 114 then compares the target trajectory with the commanded trajectory of welding torch 3, as described above. Initially, robotic welding system 100 is in a training mode, wherein a first switch 118 is closed and a second switch 120 is open and control of the welding torch trajectory is controlled by the input provided by the operator. However, if verification module 114 determines that the error between the target trajectory and the commanded trajectory is less than a predetermined threshold error, verification module 114 may open switch 118 and close switch 120 to enable autonomous operation of the robotic welding system. In the autonomous mode, a trajectory tracking controller 116 may operate welding torch 3 according to the determined target trajectory.

Example: Experimental Methodology

According to one example, the Inventors developed a parametric model of welding torch motion and an algorithm for estimating the parameters from a human welder's movements. The position and orientation of the welding torch are represented with a vector defined as follows:

$$x=[x_1 x_2 x_3 x_4 x_5]^T=[xyz\alpha\beta]^T$$

Since the nozzle of the welding torch is axisymmetric, for example, as shown in FIG. 3, the total number of degrees of freedom is five. The Inventors assumed that the welding line is piecewise, straight and uniform so that the torch motion did not change in each segment of a straight line. Typically a human welder moves the torch at a constant traveling speed, or feedrate, combined with an oscillatory motion: weaving. Thus, the Inventors modeled each torch's position and orientation $x_i(t)$ as a combination of a sinusoidal function and a linear function:

$$x_i(t)=A_i \sin(2\pi f_i t+\psi_i)+a_i t+b_i$$

In the above equation, $A_i$ is amplitude, $f_i$ is frequency, $\psi_i$ is phase angle, $a_i$ is linear velocity, and $b_i$ is a constant bias. The Inventors assume that the x axis and y axis correspond to the welding travel direction and the swing direction, respectively. This proposed model x(t) can represent stringer bead paths (i.e., straight bead paths along a welding joint) and typical weave bead paths commonly used by welders, convex, concave, FIG. 8, circular, and other suitable paths. The trajectories can be represented in a discrete-time form with a constant sampling interval $\Delta t$ and a sample index k as follows:

$$x_i(k)=A_i \sin(2\pi f_i \Delta t k + \psi_i) + a_i \Delta t k + b_i$$

The trajectory function can be parameterized as follows:

$$x_i(k) = A_i \sin(2\pi f_i \Delta t k + \psi_i) + a_i \Delta t k + b_i = [\, s_{i,k-1} \;\; c_{i,k-1} \;\; k-1 \;\; 1\,] \begin{bmatrix} \theta_{i,1} \\ \theta_{i,2} \\ \theta_{i,3} \\ \theta_{i,4} \end{bmatrix} = \varphi_i^T(k)\theta_i$$

Wherein:

$$s_{i,k-1}=\sin(2\pi f_i \Delta t(k-1))$$

$$c_{i,k-1}=\cos(2\pi f_i \Delta t(k-1))$$

$$\theta_{i,1}=A_i[\cos(2\pi f_i \Delta t)\cos \psi_i - \sin(2\pi f_i \Delta t)]$$

$$\theta_{i,2}=A_i[\sin(2\pi f_i \Delta t)\cos \psi_i - \cos(2\pi f_i \Delta t)]$$

$$\theta_{i,3}=a_i \Delta t$$

$$\theta_{i,4}=a_i \Delta t + b_i.$$

In the above expression, $x_i(k)$ corresponds to the torch tracking data stream obtained by a human demonstration. The problem is to estimate unknown parameters such as the frequency $f_i$ and the parameter vector $\theta_i$. Considering its nonlinearity, the algorithm estimates $f_i$ using a Discrete Fourier Transform prior to estimating $\theta_i$ with Recursive Least Squares. Once the value of $f_i$ is estimated, the RLS estimation algorithm can be executed.

Since DFT needs a certain number of data points, the tracking data was stored in a buffer. The data length can be a few seconds when the frequency of swing motion is, for example, around 1 Hz. The Hann window was applied to the stored dataset and zero padding was used to increase the resolution of the estimated frequency. Because the tracking data has a linear component, the DFT result has two peaks. One peak is around 0 Hz because of the linear components, and then the other peak is the answer. The resultant peak value was identified as the estimated frequency. The frequency ratio $f_x=f_y$ may be exactly be 0, 1, or 2. After $f_x$ and $f_y$ are estimated, their ratio was computed and classified to the closest standard value by thresholding. $f_x$ is then replaced as $f_x=0$, $f_x=f_y$, or $f_x=2f_y$. The estimated result of $f_y$ by DFT is usually more accurate than that of $f_x$ since y(t) has no linear components; thus, $f_x$ was replaced with a value defined by $f_y$. Accordingly, the estimated $f_x$ and $f_y$ were obtained.

Once the estimated frequencies were obtained, the unknown parameter vector $\theta_i$ was estimated by the RLS. Prior to executing the RLS, initial estimates of the parameters were obtained from the data used for the DFT computation. The batch least squares algorithm was applied to the stored data, in which the frequency was replaced by the estimated frequency $\hat{f}_i$ obtained by DFT. This method provides initial values for the unknown parameters, i.e. $\hat{\theta}_i(0)$. After the initial estimated values was obtained, the sliding DFT updated $\hat{f}_i$ and fed it to the RLS algorithm. the following RLS algorithm was applied with forgetting factor to estimate $\hat{\theta}_i(k)$:

$$\hat{\theta}_i(k) = \hat{\theta}_i(k-1) + \frac{P_i(k-1)\varphi_i(k)}{\rho_k + \varphi_i^T(k)P_i(k-1)\varphi_i}\left[x_i(k) - \varphi_i^T(k)\hat{\theta}_i(k-1)\right]$$

$$P_i(k) = \frac{1}{\rho_k}\left[P_i(k-1) - \frac{P_i(k-1)\varphi_i(k)\varphi_i^T(k)P_i(k-1)}{\rho_k + \varphi_i^T(k)P_i(k-1)\varphi_i(k)}\right]$$

In the equations above, $P_i(k)$ is a covariance matrix, $\rho_k$ is a forgetting factor ($0<\rho_k \leq 1$), and $P_i(0)$ is a positive definite matrix. Once we obtain $\hat{\theta}_i(k)$, the reference trajectory can be generated as follows:

$$\hat{x}_i(k|\hat{\theta}_i)=\varphi_i^T(k)\hat{\theta}_i$$

The reference trajectory $\hat{x}_i$ was fed to the controller of the robotic welding system so that the welding torch followed it. Because of the forgetting factor, the RLS algorithm output the parameters that gave more weight to recent data and outputs better fitting results than the old data. This method made a smooth connection between the input trajectory and the reference trajectory.

The estimated trajectory $\hat{x}_i$ may have a smooth connection but also a global similarity to the input trajectory $x_i$ made by the human welder. In order to provide the smooth connection, the squared errors of the trajectories, i.e. $(\hat{x}_i - x_i)^2$ were observed. This squared error should be smaller than a predefined threshold value $\varepsilon_i$. For the global similarity, the estimated amplitude $\hat{A}_i$ was compared with the average peak value of the input trajectory $A^-_i$. The peak amplitudes of the input trajectory were obtained by the peak detection algorithm, and the average value $A^-_i$ was recursively computed. The estimated amplitude was computed by using the estimated parameters $\hat{\theta}_{i,1}$ and $\hat{\theta}_{i,2}$. Note that the estimated parameters $\theta_i$ do not usually converge because the human hand motion inevitably has random fluctuations. That is why the instant values of $(\hat{x}_i - x_i)^2$ and $(\hat{A}_i - A^-_i)^2$ instead of a parameter convergence analysis was used.

Example: Trajectory Training with Synthetic Data

Prior to hand motion data, the developed algorithms were tested with a two-dimensional synthetic signal. The signal simulated a convex path, and consisted of two functions with random noises: $x(t)=0.6\ \sin(2\pi*2.0*t+\pi/2)+3.0t+1.0$ and $y(t)=18\ \sin(2\pi*1.0*t+\pi)$. The window length of the Discrete Fourier Transform (DTF) was chosen as 3.0 seconds. Frequencies $f_x$ and $f_y$ estimated by DFT were 1.97 Hz and 1.00 Hz respectively. $f_x$ was replaced with $2f_y=2.00$ Hz. The test signal was streamed to the algorithm and the first 3.0 seconds of the data were stored in the buffer for the DFT. After the frequency was computed, the RLS parameter estimation started. The convergence criterion was that the changes in all the parameters were lower than 1%. The convergence time was 0.5 seconds.

Example: Trajectory Training with Hand Motion Data

By using the developed virtual experimental platform, the Inventors demonstrated the real-time analysis of the motion tracking data and the seamless control transition. A concave path and a circular path were tested. In the virtual environment, the Inventors assumed a situation in which the task executed by the robot was flat welding, and the torch movement in the vertical direction (z direction) is constrained by a guiding system (e.g., a mechanical joint tracking mechanism or a sensor-based tracking system). Because of this constraint, the torch height was constant during the welding task, and the torch movement was considered to be a two-dimensional motion. A human demonstrator in this test tried to keep a uniform path. Although the demonstrator intended to make a uniform path, the path shape had random distortions. However, the disclosed algorithm was successfully able to create the reference trajectories and the two-dimensional path connecting smoothly with the human hand motion. It took 0.90 sec to complete the RLS process. The generated trajectories and the resulting two-dimensional path were smoothly connected and similar to the input signals made by the human demonstrator. The RLS process time was 1.75 sec in this case.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device in which a processor may be included may be embodied in any of a number of forms, such as a rack-mounted computer, a desktop computer, a laptop computer, an embedded processor, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a processor readable storage medium (or multiple processor readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a processor readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "processor-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Processor-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A robotic welding system comprising:
   a welding torch;
   a support configured to support the welding torch during a welding operation; one or more actuators operatively coupled to the support, wherein the one or more actuators are configured to control a movement of the welding torch in one or more directions;

an input device configured to receive operator input related to manual operation of the welding torch, wherein the operator input includes manual operation of repeatedly moving the welding torch along a commanded trajectory by an operator; and a processor operatively coupled to the one or more actuators and the input device, wherein the processor is configured to perform the steps of:

automatically estimating a repetitive trajectory based at least partially on the commanded trajectory, and approximating the repetitive trajectory as a target trajectory during the manual operation of moving the welding torch along the commanded trajectory; and operating the one or more actuators to control movement of the welding torch based at least partly on the target trajectory upon approximating the repetitive trajectory as the target trajectory.

2. The robotic welding system of claim 1, wherein the processor is configured to:

operate the one or more actuators based at least partly on the target trajectory in response to an estimation of the repetitive trajectory converging with the commanded trajectory of the welding torch.

3. The robotic welding system of claim 2, wherein the processor is configured to operate the one or more actuators based on the commanded trajectory prior to the repetitive trajectory converging with the commanded trajectory, and wherein the processor is configured to not use the commanded trajectory to operate the one or more actuators after the repetitive trajectory converges with the commanded trajectory.

4. The robotic welding system of claim 2, wherein the processor is configured to output an indication to a user when the robotic welding system transitions from the manual operation based on the commanded trajectory to autonomous operation based on the target trajectory.

5. The robotic welding system of claim 2, wherein the processor is configured to determine an error between the repetitive trajectory and the commanded trajectory of the welding torch, and wherein the processor is configured to transition to operating the one or more actuators based at least partly on the target trajectory when the error between the repetitive trajectory and the commanded trajectory is below a predetermined threshold error.

6. The robotic welding system of claim 1, wherein the processor is configured to estimate a frequency of the repetitive trajectory based at least partly on the operator input related to the manual operation of the welding torch, and wherein the processor is configured to generate the target trajectory based at least partly on the estimated frequency.

7. The robotic welding system of claim 6, wherein the processor is configured to generate an initial estimate of the target trajectory based at least partly on a set of movements of the welding torch, and wherein the processor is configured to generate the target trajectory based at least partly on the initial estimate in real-time.

8. The robotic welding system of claim 1, wherein the support is disposed on a self-propelled carriage.

9. The robotic welding system of claim 1, wherein approximating the repetitive trajectory as the target trajectory comprises:

generating an initial target trajectory based at least partly on the commanded trajectory of the welding torch during manually operating the welding torch along the commanded trajectory; and updating the initial target trajectory, upon generating the initial target trajectory, to generate an updated target trajectory by manually operating the welding torch along the commanded trajectory for at least one more time.

\* \* \* \* \*